United States Patent
Paek et al.

Patent Number: 6,163,248
Date of Patent: Dec. 19, 2000

[54] CUP LUMINOUS APPARATUS AND ITS CONTROL METHOD

[76] Inventors: Seung-Mok Paek, 278-35 Shinhyun-dong, Seo-ku, Inchon-si; Ki-Sun Choi, 7 Songhak-dong 1 Ga, Chung-ku, Inchon-si, both of Rep. of Korea

[21] Appl. No.: 09/256,119

[22] Filed: Feb. 24, 1999

[30] Foreign Application Priority Data

Mar. 6, 1998 [KR] Rep. of Korea .................... 98-3227

[51] Int. Cl.⁷ .................................................. G08B 23/00
[52] U.S. Cl. ........................... 340/321; 340/326; 362/101
[58] Field of Search .................................... 362/101, 806, 362/800; 40/324; 340/321, 326, 332

[56] References Cited

U.S. PATENT DOCUMENTS

| | | |
|---|---|---|
| 2,663,866 | 12/1953 | Simpson . |
| 3,735,113 | 5/1973 | Stott ..................................... 350/96.24 |
| 5,211,699 | 5/1993 | Tipton ........................................ 362/101 |
| 5,339,548 | 8/1994 | Russell ....................................... 40/324 |
| 5,553,735 | 9/1996 | Kimura ...................................... 40/324 |
| 5,785,407 | 7/1998 | Ratcliffe et al. ......................... 362/101 |
| 5,879,068 | 3/1999 | Menashrov et al. ..................... 362/101 |

*Primary Examiner*—Brent A. Swarthout
*Attorney, Agent, or Firm*—Skjerven Morrill MacPherson LLP

[57] ABSTRACT

In an inventive cup luminous apparatus and its control method, the cup luminous apparatus is capable of luminescing in various colors corresponding to the fluid level of beverage put in a cup thus providing the cup with a light effect, detecting a proper consistency, a decay extent and an appropriate temperature of the beverage put into the cup, and then luminescing in mutually different colors based on its detection result, whereby a user may visually recognize a physical state of the beverage. The inventive cup also automatically flickers in case that the cup is slanted and is provided so as to be mounted more easily. The cup luminous apparatus includes a plurality of resistance detection elements installed on an inner wall face of the cup, for detecting resistance values changed by the water level, the consistency and the temperature change of beverage put into the cup; an analog/digital converter for converting analog signals detected by the resistance detection elements; light emitting elements for outputting light of mutually different colors from the inside of the cup towards the outside of the cup; and a controller for outputting a voice signal in response to an on/off state of the resistance detection elements, simultaneously outputting a toggle signal to the light emitting elements, and outputting a lighting signal to the light emitting elements in case a resistance value inputted from the analog/digital converter equals the proper consistency data and proper temperature data, and outputting a flicker signal to the light emitting element s in case the resistance value equals the decay consistency data and overheating temperature data; and a voice output element equipped in the cup and driven by the voice signal outputted through the controller.

8 Claims, 10 Drawing Sheets

CUP LUMINOUS APPARATUS AND ITS CONTROL METHOD

BACKGROUND OF THE INVENTION

1. Field of the Invention

The present invention relates to a cup luminous apparatus and its control method; and, more particularly, to a cup luminous apparatus and its control method, which is capable of luminescing in various colors corresponding to the water (or fluid) level of a beverage put in a cup, simultaneously outputting voice so as to provide the cup with a light effect, detecting a proper consistency, a decay extent and an appropriate temperature of the beverage put into the cup and then luminescing in mutually different colors based on its detection result to enable a user to visually recognize a physical state of the beverage, and automatically flickering in case that the cup is tilted, together with a function of filling the cup more easily.

2. Description of the Prior Art

In general, a cup is used to put beverage such as liquor and water thereinto so that a user may drink the beverage, and has various colors according to kinds of molding materials or dyestuffs used in manufacturing the cup. Such colors of the cup are harmonized with colors of the beverage, to then make users have an aesthetic feeling and stimulate a user's appetite, influencing an aesthetic taste.

However, the users are tired of using such conventional cups since colors of the cups can not be actively changed. Also, the conventional cups have nothing in their functions, except such physical function that they are used for putting beverage thereinto. That is, in order to be informed of the proper consistency, the decay extent and the appropriate temperature of the beverage, there is inconvenience that the user should sample the beverage or learn them only through the sense of smell or a skin stimulus.

SUMMARY OF THE INVENTION

It is, therefore, a primary object of the invention to provide a cup luminous apparatus capable of luminescing in various colors corresponding to the water (or fluid) level of beverage put in a cup, visually representing a proper consistency, a decay extent and an appropriate temperature of beverage for users, and cutting off an inflow of water to a printed circuit board installed thereinside.

Another object of the invention is to provide a control method of a cup luminous apparatus capable of automatically switching on and off in various light modes according to a standard or inclination of a cup's tilt.

In accordance with the present invention for achieving the above objects, a cup luminous apparatus includes a plurality of resistance detection elements installed by each different height on an inner wall face of a cup, for detecting resistance values changed by a water (or fluid) level, a consistency and a temperature change of beverage put into the cup; an analog/digital converter for converting analog signals detected by the resistance detection elements into digital signals; a multiple number of light emitting elements for outputting light of mutually different colors from the inside of the cup towards the outside of the cup; a controller for outputting a voice signal for a given time in response to an on/off state of a resistance detection element located on the uppermost position among a plurality of resistance detection elements, simultaneously outputting a toggle signal so that a lighting state of the light emitting element is converted, and outputting a lighting signal so that only one light emitting element among a multiple number of light emitting elements is turned on, in case a resistance detection element positioned on the lowermost lot is turned "on", and sending a lights-out signal so that all the light emitting elements are turned off, in case the resistance detection element positioned on the lowermost lot is turned "off", and providing a lighting signal so that all the light emitting elements are turned on, in case a resistance value inputted from the analog/digital converter equals preset proper consistency data and preset proper temperature data, and outputting a flicker signal so that the light emitting element is flickered in order to inform of a decay and an overheating of the beverage, in case the resistance value inputted from the analog/digital converter equals preset decay consistency data and preset overheating temperature data; and a voice output element equipped in the cup and driven by the voice signal outputted through the controller.

In another aspect of the present invention, a control method of the cup luminous apparatus consists of an inversion state detecting step of periodically detecting contacts of an angle switch, and transferring a command performance to a memorizing step described in the following if the contact of the angle switch is inverted; a memorizing step of memorizing an inverted state when the contact of the angle switch is inverted; a delay step of delaying an operation for a given delay time; a flicker step of flickering the light emitting elements for a constant flickering time if the delay time in the delay step lapses; a lighting step of lighting the light emitting elements on the basis of a given flickering number with an interval of a constant time, for a given lighting time in the flicker step; a contact return state detecting step of cutting off driving current flowing into the light emitting element in a lights-out step described in the following, in case that a contact state detected on the angle switch last as a state different from the inversion state memorized in the memorizing step, more than a given inversion duration time, and then again executing the inversion state detecting step till the contact is re-inverted, and excepting this case, repeatedly performing the above-mentioned steps; and a lights-out step of putting out lights by cutting off the driving current flowing into the light emitting element.

BRIEF DESCRIPTIONS OF THE DRAWINGS

The above and other objects and features of the instant invention will become apparent from the following description of preferred embodiments taken in conjunction with the accompanying drawings, in which.

Figure 3:
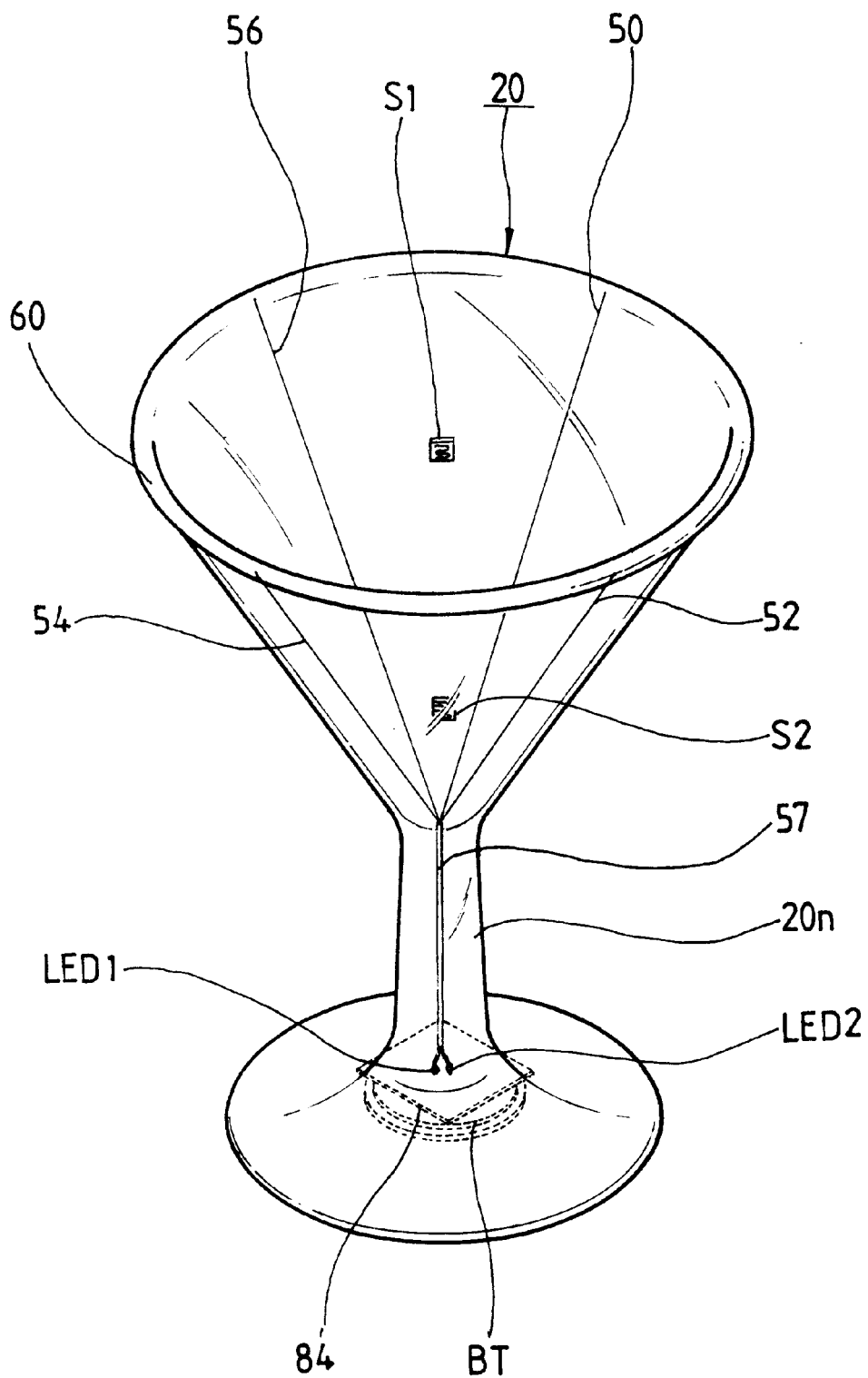
Figure 4:
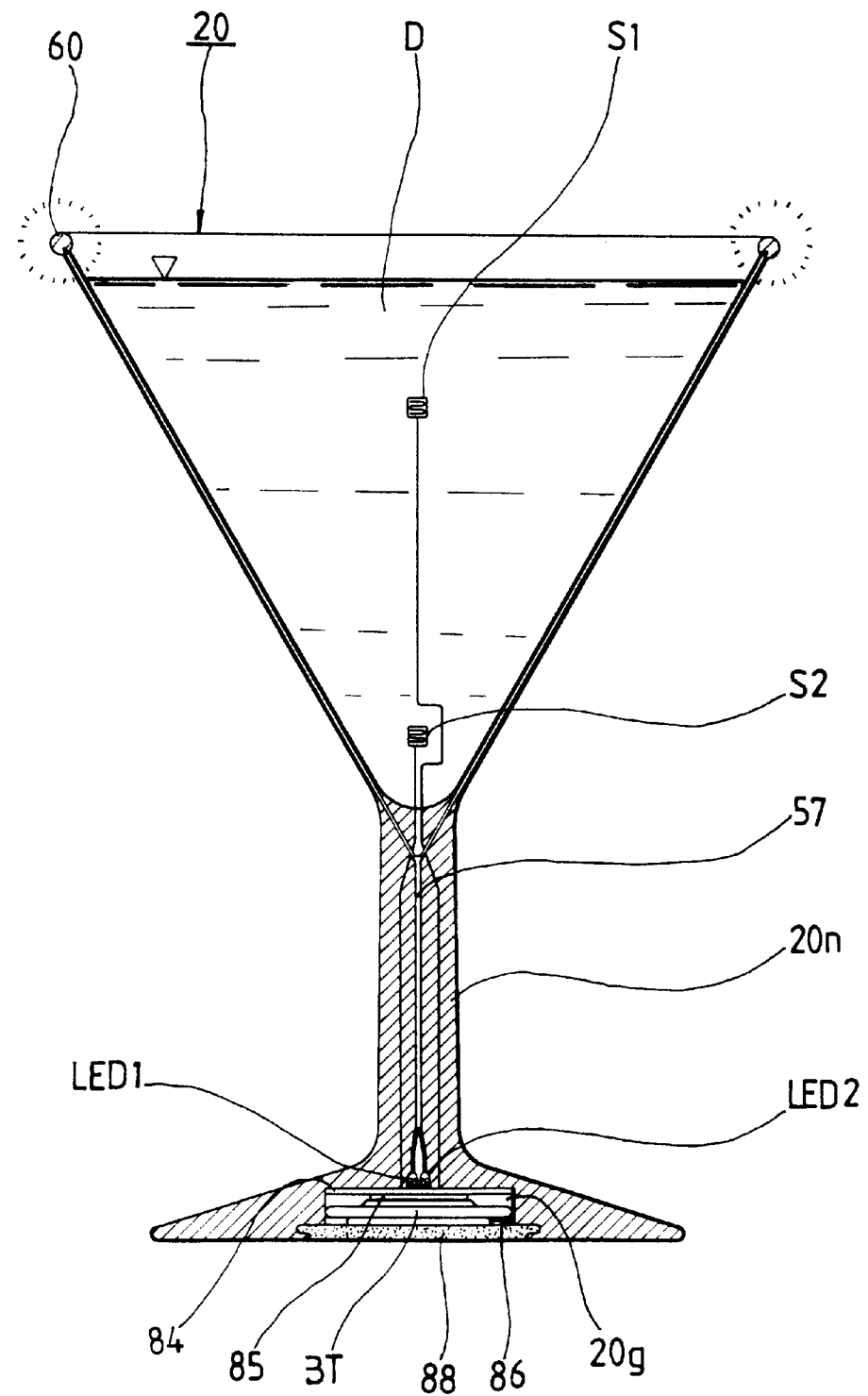
Figure 5:
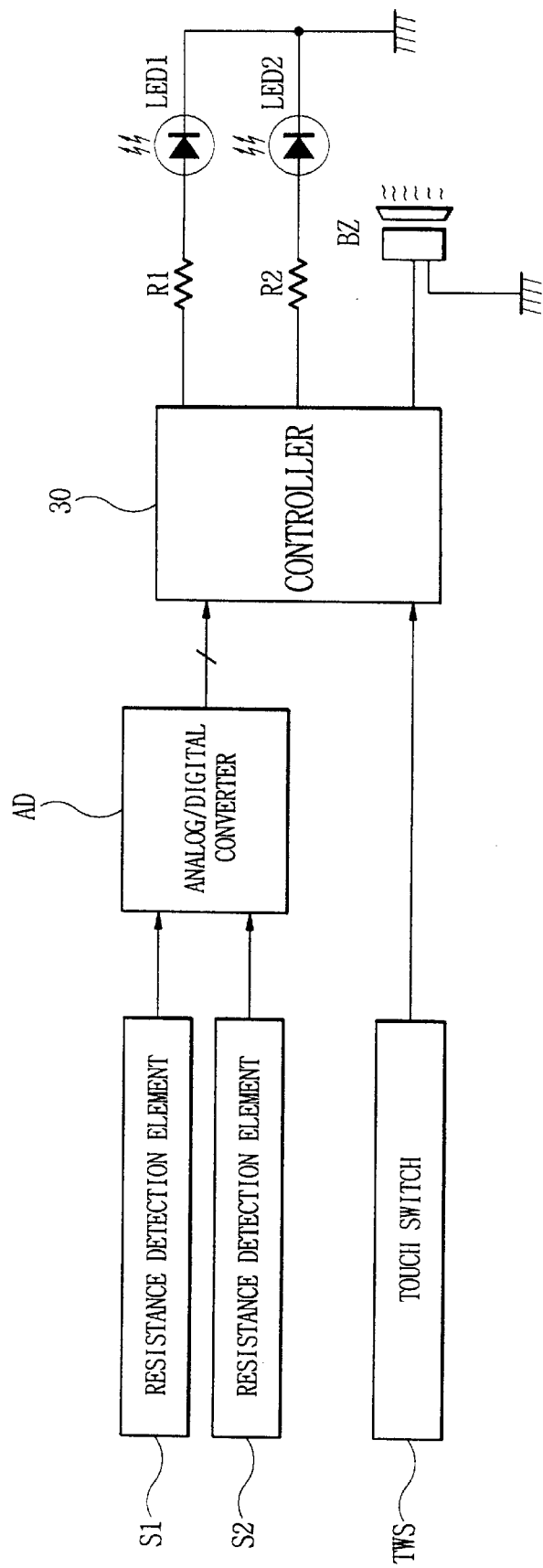
Figure 6:
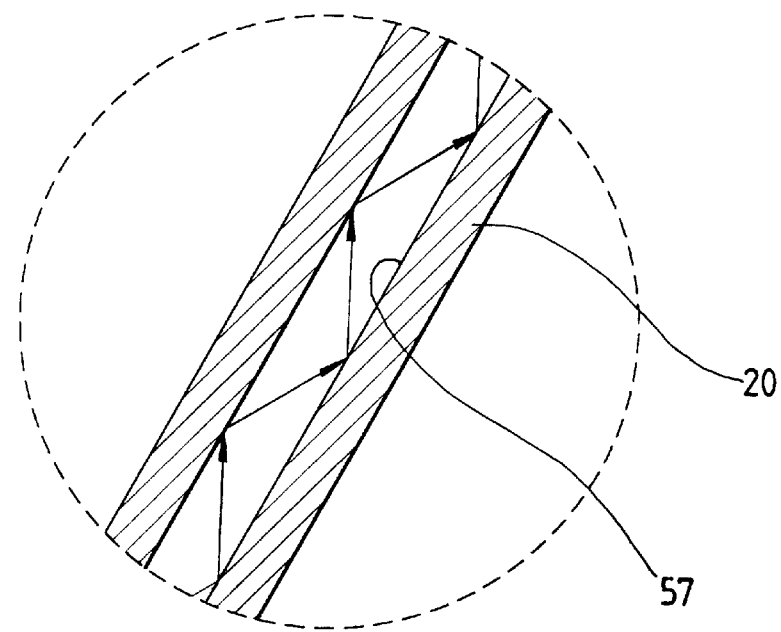
Figure 7:
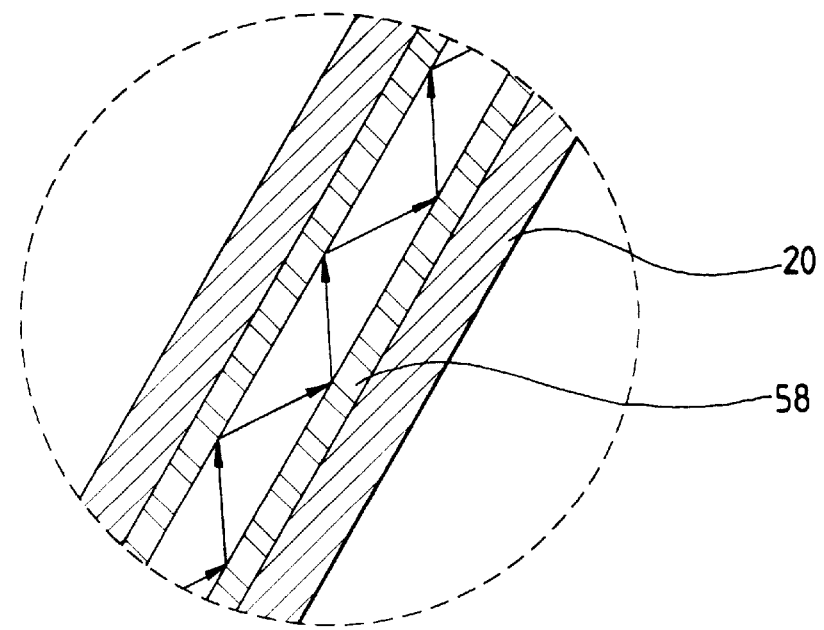
Figure 8:
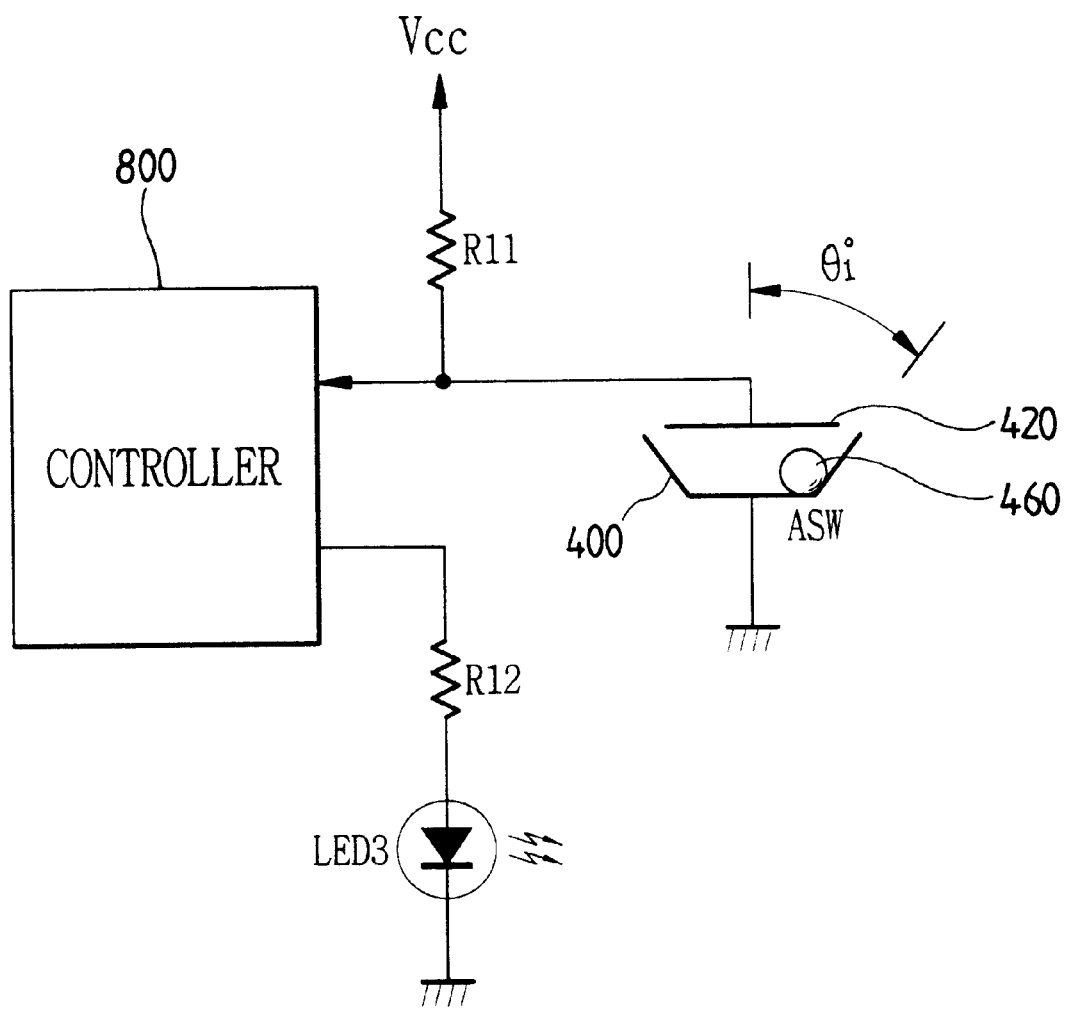
Figure 9:
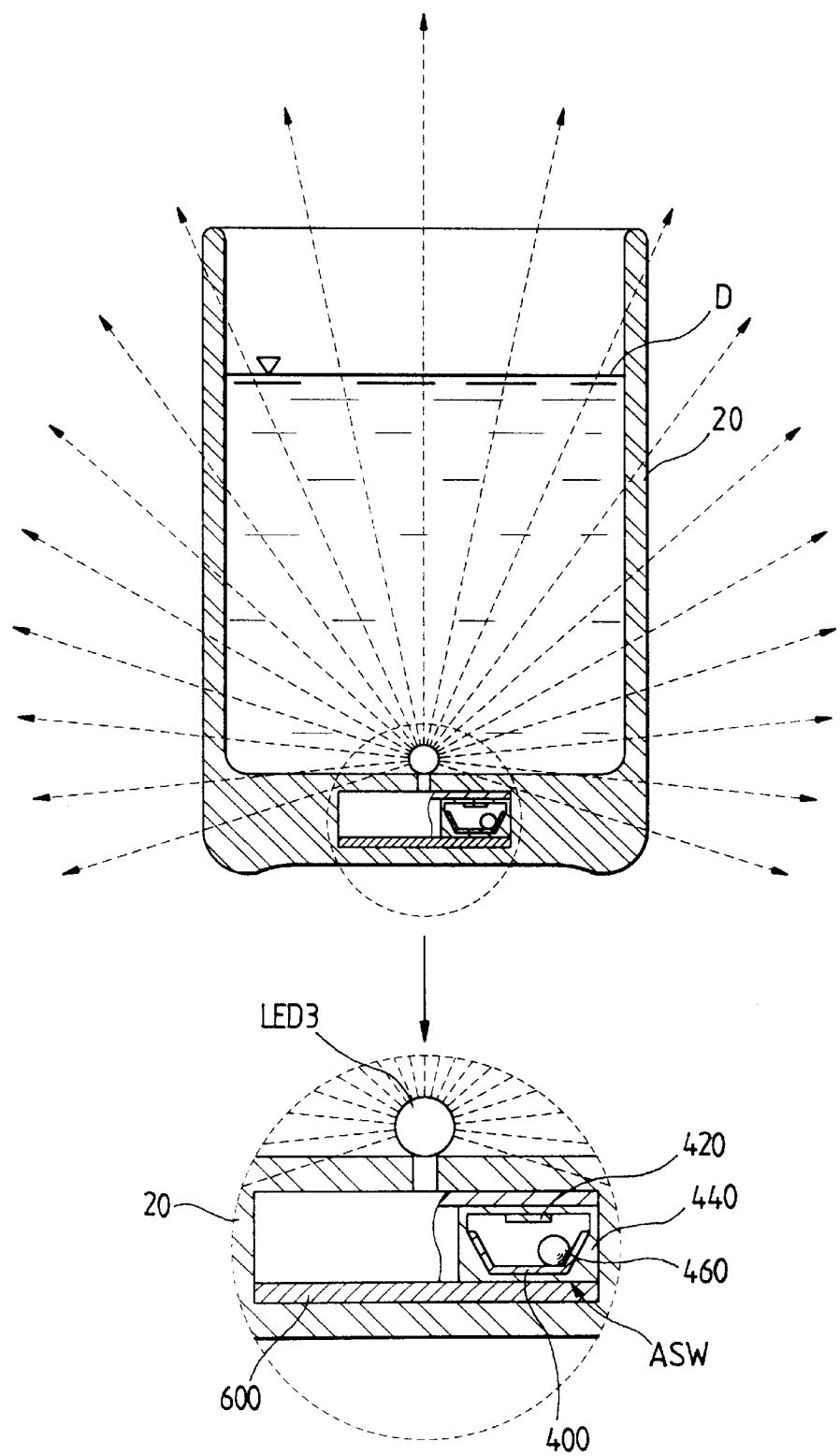
Figure 10:
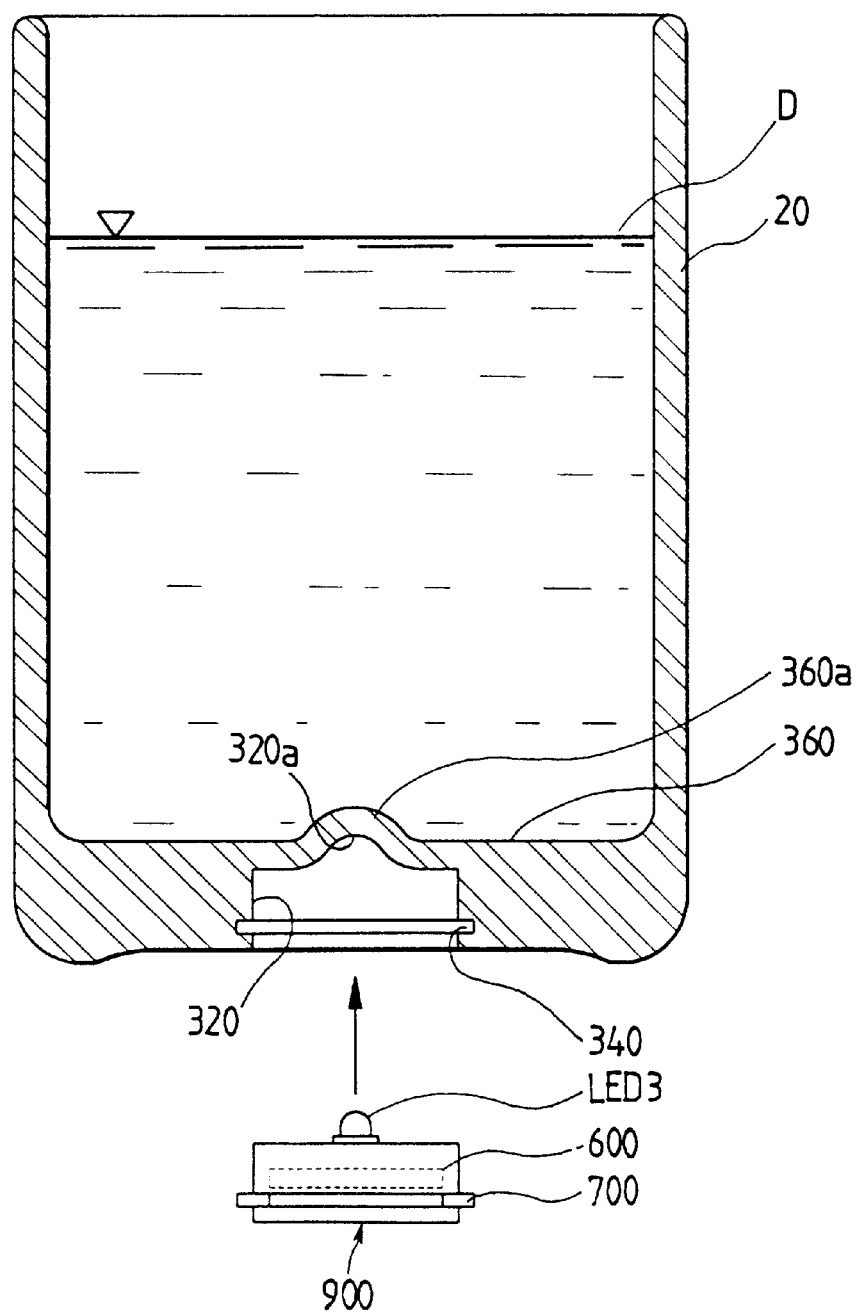
Figure 11:
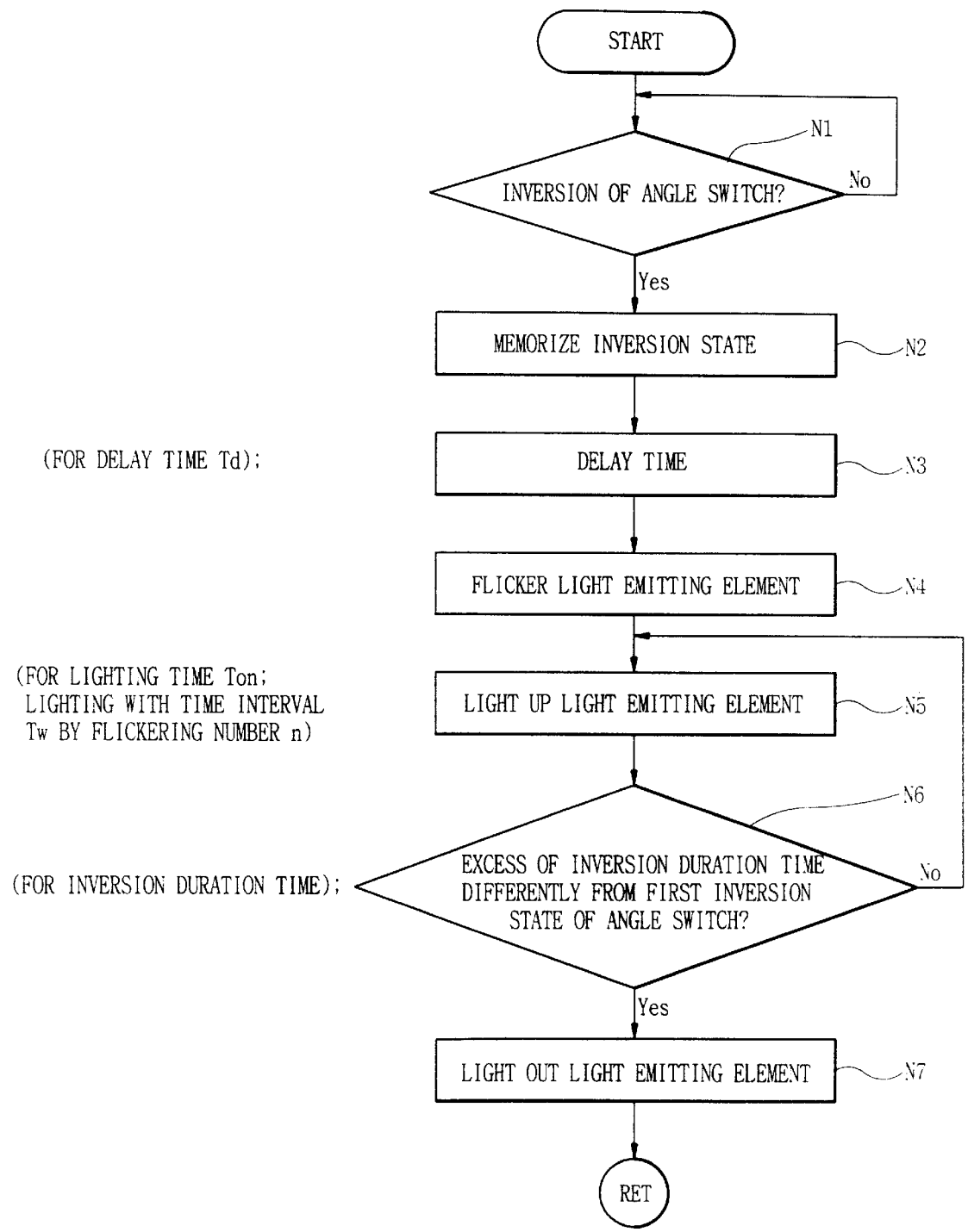

FIG. 3 sets forth a sectional view of a cup luminous apparatus based on another embodiment of the present invention;

FIG. 4 illustrates a perspective view of a cup luminous apparatus based on another embodiment of the present invention;

FIG. 5 provides a block diagram of a cup luminous apparatus in one embodiment of the present invention;

FIG. 6 furnishes a sectional view for one embodiment of a light transfer unit in an inventive cup luminous apparatus;

FIG. 7 offers a sectional view for another embodiment of the light transfer unit in an inventive cup luminous apparatus;

FIG. 8 depicts a block diagram representing a still another embodiment of the inventive cup luminous apparatus;

FIG. 9 indicates a sectional view of an angle switch installed in the inventive cup luminous apparatus;

FIG. 10 is a sectional view illustrating a waterproof structure of a printed circuit board equipped in the inventive cup luminous apparatus; and FIG. 11 is a flowchart providing a controlling method of the inventive cup luminous apparatus.

DESCRIPTION OF THE PREFERRED EMBODIMENT

The preferred embodiments of the present invention are described in detail as follows, referring to the accompanying drawings.

In accordance with the present invention, the construction of a cup luminous apparatus based on the embodiments is described in the following.

Figure 1:
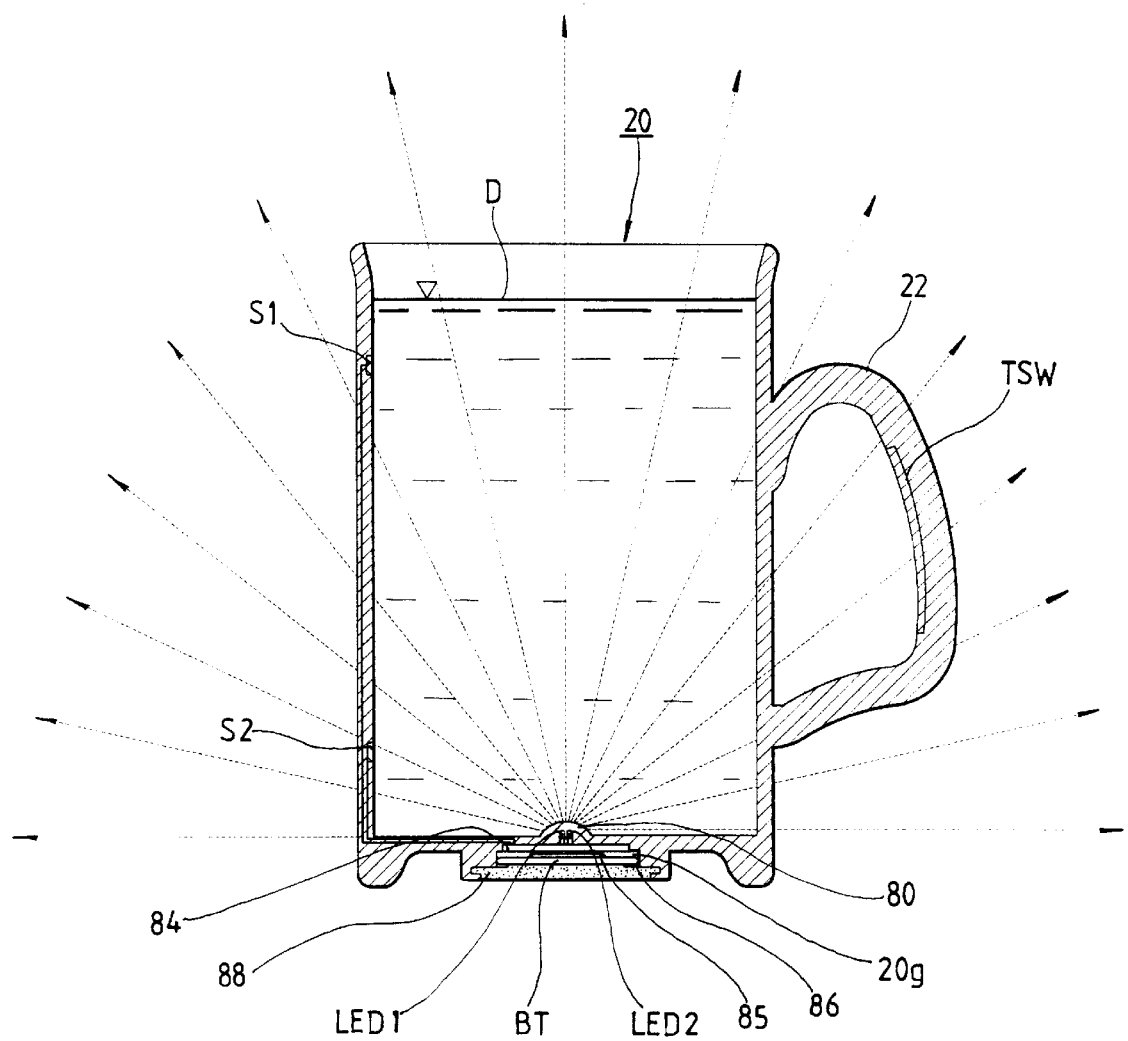
FIG. 1 shows a sectional view of a cup luminous apparatus based on one embodiment of the present invention.
Figure 2:
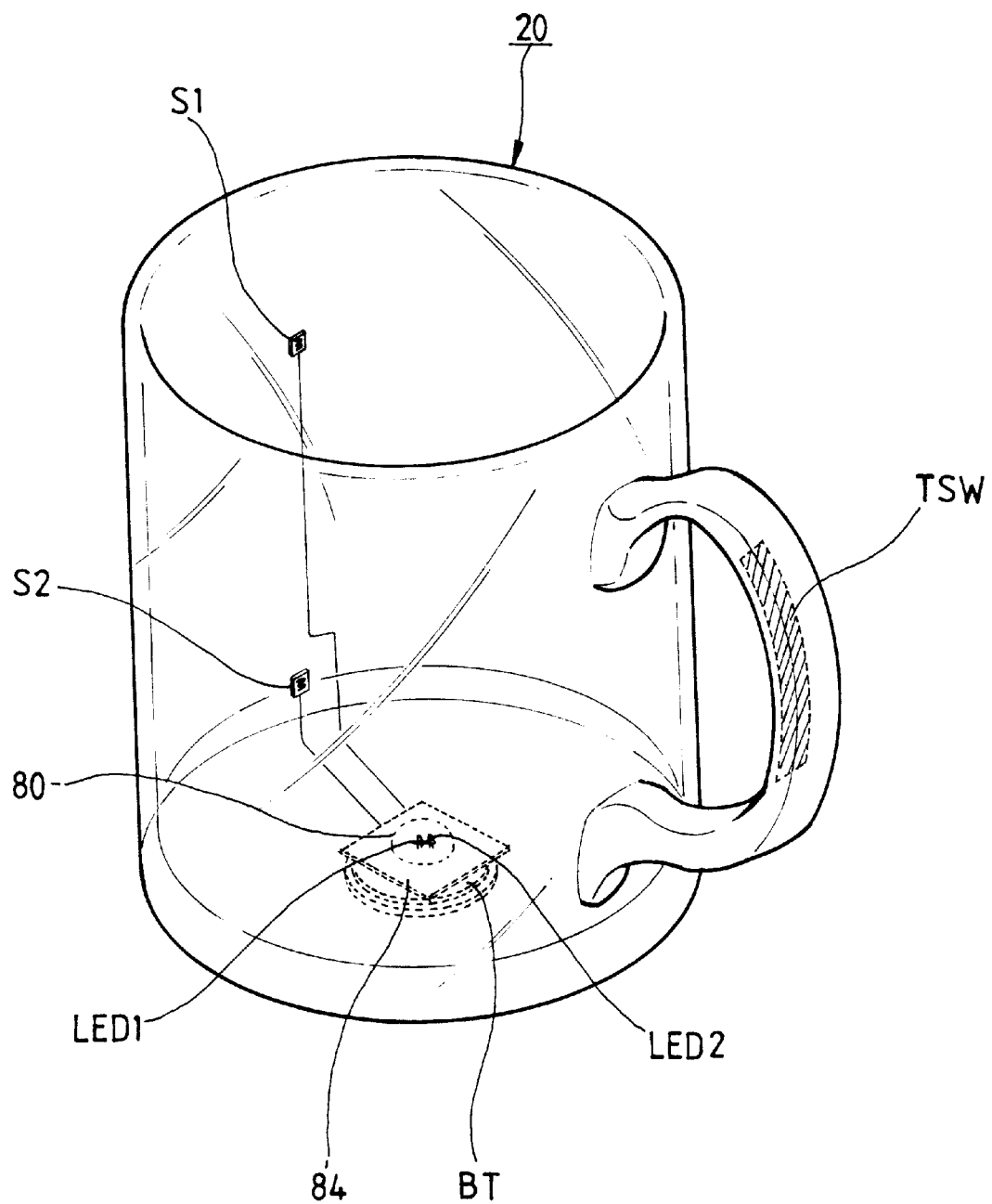
FIG. 2 represents a perspective view of a cup luminous apparatus based on one embodiment of the present invention.

FIG. 1 is a sectional view showing one embodiment of the inventive cup luminous apparatus, FIG. 2 illustrates a perspective view showing one embodiment of the inventive cup luminous apparatus, and FIG. 5 indicates a block diagram based on one embodiment of the cup luminous apparatus. As shown in such diagrams, a cup luminous apparatus is composed of a plurality of resistance detection elements S1, S2 installed with each a different height on an inner wall face of a cup 20, for detecting resistance values changed by a water (or fluid) level, a consistency and a temperature change of beverage D put into the cup 20; an analog/digital converter AD for converting analog signals detected by the resistance detection elements S1, S2 into digital signals; a multiple number of light emitting elements LED1, LED2 for outputting light of mutually different colors from the inside of the cup 20 towards the outside of the cup 20; a controller 30 for outputting a voice signal for a given time in response to an on/off state of the resistance detection element S1 located on the uppermost position among a plurality of resistance detection elements S1, S2, simultaneously outputting a toggle signal so that a lighting state of the light emitting elements LED1, LED2 is converted, and outputting a lighting signal so that only one light emitting element LED1 among a multiple number of light emitting elements LED1, LED2 is turned on, in case a resistance detection element S2 positioned on the lowermost lot is turned "on", and sending a lights-out signal so that all the light emitting elements LED1, LED2, are turned off, in case the resistance detection element S2 positioned on the lowermost lot is turned "off", and providing a lighting signal so that all the light emitting elements LED1, LED2, are turned on, in case a resistance value inputted from the analog/digital converter AD equals preset proper consistency data and preset proper temperature data, and outputting a flicker signal so that the light emitting elements LED1, LED2, are flickered in order to inform of a decay and an overheating of the beverage D, in case the resistance value equals preset decay consistency data and preset overheating temperature data; and a voice output element BZ equipped in the cup 20 and driven by the voice signal outputted through the controller 30.

The cup 20 is herein molded by transparent material, and a printed circuit board having the light emitting elements LED1, LED2 and circuit chips equipped thereon, is installed in a lower side of the cup 20. Under a bottom face of the printed circuit board 84, battery contacts 85, 86 are formed with the construction that a battery BT of a flat shape such as mercury battery can be installed and the battery BT can be inserted into an opening part 20g formed on a lower face of the cup 20 and then can be tightly closed up by a rubber cover 88.

Each of the resistance detection elements S1, S2 is installed on the upper and lower positions of the inner wall face of the cup 20, with a height difference from each other, and may be constructed by using a high density contact pattern neighboring to each other.

A dome-shaped lens part 80 is formed on a bottom face of the cup 20 on which the light emitting elements LED1, LED2 are positioned, and it is not surely limited to such shape, but it can be constructed, as an example, so as to be effectuated with such an effect that it seems that a flame is located in the beverage D by forming the lens part 80 as a flame shape such as a candlelight type.

For the sake of a visual effect, also, it is equipped with a touch switch TSW connected to an input port of the controller 30 and installed in a handle 22 of the cup 20, for detecting a state when that a user takes hold of the handle 22 of the cup 20, thereby making the light emitting elements LED1, LED2 light through the controller 30.

FIG. 3 is a sectional view showing another embodiment of the inventive cup luminous apparatus, and FIG. 4 represents a perspective view illustrating another embodiment of the inventive cup luminous apparatus. As shown in such drawings, an inventive basic structure is the same as one embodiment. The cup luminous apparatus based on another embodiment consists of a multiple of light transfer units 50, 52, 54, 56 installed in the cup 20, for transferring light emitted from each of the light emitting elements LED1, LED2 and transferring the light through each of different paths from each other; and an optic diffusion lens part 60 formed on an edge part of an upper end of the cup 20, for diffusing the light transferred from the light transfer units 50, 52, 54, 56.

As shown in FIG. 6, the light transfer units 50, 52, 54, 56 may be constructed by forming a hollow hole 57 having a constant diameter in the cup 20, and also, as shown in FIG. 7, may be constructed by optical fiber 58 buried in the cup 20.

The optical fiber 58 is made up of a multiplicity of optical fibers 58 receiving the light provided from the respective light emitting elements LED1, LED2. The bundle of these optical fibers is passed through the center of a neck portion 20n of the cup 20, and each of the optical fibers is provided separately so as to be directed towards the optic diffusion lens part 60 installed on the edge portion of the upper side of the cup 20 through the inner wall face of the cup 20.

A sectional part of the optic diffusion lens part 60 is herein formed in a circular shape as an example, but is not surely limited to such shape.

The controller 30 is composed of a program memory for previously storing proper consistency data and appropriate temperature data in which resistance values based on a consistency and a temperature change of the beverage detected by the resistance detection elements S1, S2 are compared and decided, decay consistency data representing a decay extent and an overheating temperature data, and a microcontroller of one chip shape having a data memory.

As shown in FIG. 8, an angle switch ASW is also equipped in the inventive cup 20 so that a flickering time of a light emitting element LED3 is controlled by a controller 800 when a contact state is inverted in case that the cup 20 is tilted over a given angle $\theta_1°$.

The light emitting element LED3 may be constructed by using a light emitting diode having high luminance, but it is not definitely restricted to such light emitting element LED3.

The given angle $\theta_1°$ that a contact of the angle switch ASW is turned off, is herein represented as 45°, 20°, 600°, etc., but it is not surely limited to such angle.

In FIG. 9, the angle switch ASW is constructed by a lower contact 400 of a dish shape having that an upper part that is wide and a lower part that is narrow; an upper contact 420 of a flat shape positioned on an upper side from the lower contact 400, in an isolation state from the lower contact 400; an insulation case 440 for connecting the lower contact 400 and the upper contact 420; and a metal bead 460 positioned within a space formed by the lower and upper contacts 400, 420, for shorting the lower contact 400 and the upper contact 420 when the metal bead 460 is caught therebetween in case that the cup 20 is tilted. Such metal bead 460 may be embodied by using a movable contact of a fluid state which is maintained at a normal temperature, the movable contact having a comparatively high viscosity like mercury.

FIG. 10 is a sectional view showing a waterproof structure of the printed circuit board set in the cup luminous apparatus of the invention, and as shown in this diagram, there is constructed an acceptance space 320 formed in the lower part of the cup 20; a circular flute 340 in which a packing 700 is located, the circular flute 340 being formed on an inner face of the acceptance space 320; the packing 700 inserted into the circular flute 340 and situated on an outer circumference face of a case 900 in which a printed circuit board 600 is installed thereinside; and a concave lens part 320a and a convex lens part 360a on which the light emitting element LED3 is situated, the concave lens part 320a and a convex lens part 360a being positioned on the center of the inner upper side of the acceptance space 320 and the bottom face 360 of the cup 20.

In FIG. 11 there is shown a flowchart for operations of the inventive cup luminous apparatus. As shown in the drawing there is an inversion state detecting step N1 of periodically detecting contacts of the angle switch ASW, and transferring a command performance to the following memorizing step if the contact of the angle switch ASW is inverted; a memorizing step N2 of memorizing an inverted state when the contact of the angle switch asw is inverted; a delay step N3 of delaying an operation for a given delay time Td; a flicker step N4 of flickering the light emitting element LED3 for a constant flickering time TonoDD if the delay time Td in the delay step N3 lapses; a lighting step N5 of lighting the light emitting element LED3 on the basis of a given flickering number N with an interval Tw of a constant time, for a given lighting time Ton in the flicker step N4; a contact return state detecting step N6 of cutting off driving current flowing into the light emitting element LED3 in the following lights-out step N7, in case that a contact state detected on the angle switch ASW has lasted as a state different from the inversion state memorized in the memorizing step N2, more than a given inversion duration time Ti, and then again executing the inversion state detecting step N1 till the contact is re-inverted, and excepting this case, repeatedly performing the above steps; and a lights-out step N7 of putting out lights by cutting off the driving current flowing into the light emitting element LED3.

For example, the above delay time Td may be determined as two seconds, and the flickering time TonoDD may be determined as three seconds, and the time interval Tw can be determined as one second. Also, the lighting time Ton can be determined as five seconds, and the flickering number N may be determined as five, and the inversion duration time Ti may be set as ten minutes. Such determination can be written at the program memory of the controller 800, but it is not surely limited to such time, that is, it can be determined optionally.

Reference numbers of the drawings, R1, R2, R12, not described on the above, represent current controlling resistances for controlling the current flowing into the light emitting elements LED1, LED2, and R11 indicates a pull-up resistance.

Operations of the inventive cup luminous apparatus are described in detail as follows, referring to the accompanied drawings.

In FIG. 1, if beverage D, e.g., liquors, water, etc., is poured into an empty cup 20, the beverage D fills up in the cup 20, to a certain level.

In such procedure, if the beverage D contacts the lowermost resistance detection element S2, the contact of the resistance detection element S2 is turned off to then input a signal informing of a turn-off of the contact to the input port of the controller 30 through the analog/digital converter AD.

Then, the controller 30 turns on one light emitting element LED1 out of multiple light emitting elements LED1, LED2 through its output port and, simultaneously drives the voice output element BZ for a given time to thereby output voice like melody.

The light radiated from the light emitting element LED1 is diffused through the lens part 80 formed on the bottom face of the cup 20, is penetrated through the beverage D and the cup 20, and is radiated towards the outside, as in one embodiment shown in FIGS. 1 and 2. In such procedure, the light radiated from the light emitting element LED1 is scattered in the beverage D and the cup 20, to be whereby shown like the beverage D and the cup 20 itself emit the light. In another embodiment of FIGS. 3 and 4, the light radiated from the light emitting element LED1 is also radiated through the hollow hole 57 or the optic fiber 58 of the light transfer units 50, 52, and is transferred to the optic diffusion lens part 60 situated on the edge of the upper part of the cup 20. The light is diffused in the optic diffusion lens part 60 to be thereby shown like the edge itself of the cup 20 emits the light.

In such state the level of water (or fluid) for the beverage D is gradually heightened to then contact with the uppermost resistance detection element S1, and the contact of the resistance detection element S1 is turned off to then input a signal informing of a turn-off of the contact to the input port of the controller 30 through the analog/digital converter AD. At the same time, the controller 30 outputs the lighting and lights-out signals through its output port so that a plurality of light emitting elements LED1, LED2 perform a toggle operation, and simultaneously, outputs voice for a given time by driving the voice output element BZ.

That is, the light emitting element LED1 lighted previously is turned off, and the light emitting element LED2 lighted-out previously is turned on to radiate other light of other color. Equally to the above-mentioned case, in one embodiment the light is radiated through the lens part 80, to be then penetrated through the beverage D and the cup 20, towards the outside. In another embodiment, also, the light is passed through the light transfer units 54, 56 so as to be shown diffused.

Among such procedures an electric analog resistance value based on the consistency and temperature of the beverage D is detected by the resistance detection elements S1, S2 and is converted into a digital signal through the analog/digital converter AD. And then the converted digital signal is inputted through the input port of the controller 30. At this time, in case that a state of the beverage D equals the predetermined proper consistency data and temperature data, the controller 30 lights up all the light emitting elements LED1, LED2 to thus make the light having a mixed color to be emitted in order to visually inform that the beverage D put into the cup 20 has the proper consistency and temperature. Meantime, in case that a state of the beverage D put into the cup 20 equals decay consistency data and overheating temperature data previously stored at the controller 30, the controller 30 turns on and off the light emitting elements LED1, LED2 in order to alarm and inform a user of a decay and an overheating of the beverage D.

In other words, in case the consistency of the beverage D has a proper ratio or does not have the proper ratio, there is a difference in the electric resistance, Therefore, it is checked whether an electric resistance value of the beverage D detected by the resistance detection elements S1, S2 equals the proper consistency data, the appropriate temperature data, the decay consistency data and the overheating temperature data which are stored at the program memory of the controller 30, and then, all the light emitting elements LED1, LED2 are turned on, or turned on and off by its checking result.

In a state that the level of water (or fluid) for the beverage D put into the cup 20 is higher than the uppermost resistance detection element S1, if its water level is changed to a position lower than the uppermost resistance detection element S1 by a drinking of the user, the controller 30 outputs the lighting and lights-out signals through the output port connected to the light emitting elements LED1, LED2 so that the previously lighted light emitting element LED2 is turned off and the previously lighted-out light emitting element LED1 is turned on. At the same time, the controller 30 outputs the voice signal through its output port connected to the voice output element BZ, to thereby drive the voice output element BZ for a given time and send the voice like melody.

Operations based on another embodiment of the invention are described in detail as follows, referring to a flowchart.

As shown in FIG. 11, in case that the user tilts the cup 20 by a constant angle $\theta_1°$ in order to drink beverage or liquor put into the cup 20, the contact of the angle switch ASW is turned off and such signal is inputted to the input port of the controller 800.

That is, in such inversion of the contact provided by the angle switch ASW, if the cup 20 is changed to a horizontal state, the angle switch ASW maintains its horizontal state as shown in FIG. 9. At this time, the metal bead 460 put on the lower contact 400 of a dish shape having the wide upper part and the narrow lower part is under such a state that the the metal bead 460 contacts only with the lower contact 400 and is distant from the upper contact 420. Namely, there is maintained an opening state of the contact.

When the cup 20 is tilted in the above state, the angle switch ASW is slanted together with and the metal bead 460 put on the lower contact 400 is rolled to be caught between the lower contact 400 and the upper contact 420, thereby the lower contact 400 and the upper contact 420 are electrically connected and the contact is inverted into its closing state.

In such inversion, the controller 800 detects its inversion of the angle switch ASW in a step N1 of FIG. 11, and memorizes the inversion state in a step N2.

As shown in FIG. 9, namely, when the cup 20 is under the horizontal state, the contact of the angle switch ASW has an open state. As shown in FIG. 8, therefore, electric potential of a high level, a signal of "1" as a digital signal, is always inputted to the input port of the controller 800, and in the midst of such continuous input if the cup 20 is tilted, the contact of the angle switch ASW is turned off and electric potential of a low level, a signal of "0" as a digital signal, is inputted to the input port of the controller 800, and the value of "0" is stored at a temporary memory of the controller 800.

After that, the controller 800 delays an operation for a given delay time Td in a step N3 of FIG. 11, and when the given delay time Td lapses, the light emitting element LED3 flickers for a constant flickering time TonoDD in a step N4, by outputting a pulse signal through the output port of the controller 800.

In an example, in case the delay time Td is determined as two seconds and the flickering time TonoDD as three seconds, the light emitting element LED3 flickers for three seconds after two seconds.

Herewith, the light radiated from the light emitting element LED3 is diffused in the beverage D and in the cup 20, namely, it is shown like the overall cup 20 itself shines.

Then, when the flickering time TonoDD lapses, in a step N5 the controller 800 transmits the pulse signal through the output port thereof so that the light emitting element LED3 is lighted up with the constant time interval Tw, for the given lighting time Ton, by the constant flickering number N. After that, the light emitting element LED3 maintains a lighting state for a lighting time.

For example, if it is determined that the time interval Tw is as one second, the lighting time Ton is as five seconds and the flickering number N is as five times, the light emitting element LED3 flickers five times, for five seconds, with an interval of one second.

When the next lighting time Ton lapses, in case that a contact state detected on the angle switch ASW lasts as a state different from the inversion state memorized in the memorizing step N2, more than a given inversion duration time Ti, in a step N6; in a step N7 the controller 800 cuts off driving current flowing into the light emitting element LED3 so as to become the lights-out state, and then re-executes the inversion state detecting step N1 till the contact is re-inverted. Excepting this case, the controller 800 repeatedly performs the above-mentioned lighting step N5.

In case the inversion duration time Ti is for example determined as ten minutes and the angle switch ASW does not last the inversion state for ten minutes, the current flowing into the light emitting element LED3 is cut off so as to be lighted out, then becomes a stand-by state.

That is, in detecting the state that the cup 20 is put on a flat position such as a table without using the cup 20, if a signal detected from the angle switch ASW for a predetermined inversion duration time Ti does not last the state inverted in tilting the cup 20, it is decided that the cup 20 is not used, thus, the current flowing into the light emitting element LED3 is cut off so as to curtail electricity.

Meanwhile, the packing 700 is installed on an outer circumference of the case 900 in which the printed circuit board 600 is equipped therewithin, and this is inserted into the acceptance space 320 formed in the lower part of the cup 20. Then, the packing 700 is inserted into the circular flute 340 formed on the inner circumferential face of the acceptance space 320, so as to tightly close the inside and outside thereof.

The light emitting element LED3 set on the printed circuit board 600 is situated on the concave lens part 320a formed in the inside of the acceptance space 320, and when the light emitting element LED3 emits the light, the light is diffused in a radial type through the convex lens part 360a formed on the bottom face of the cup 20.

When the cup 20 having an installment of the packing 700 is washed by water, an inflow of water into the inside of the case 900 is prevented, to thereby prevent the pattern of the printed circuit board 600 from being shorted.

In accordance with the present invention, as aforementioned, an cup is constructed by using a resistance detection element, controller and a plurality of light emitting elements, and in such construction, the cup may emit the light having various colors according to the level change of water (or fluid) for the beverage put into the cup. That is, the cup can perform an active operation by such inventive construction and stimulate an angle of view of the user. Accordingly, there is an effect in more improving a purchasing desire of the user and there also are constructed a resistance detection element, an analog/digital converter, a controller and light emitting elements, to thereby enable to visually know proper consistency and temperature of beverage before drinking it and to control the consistency of the beverage definitely and simply comparatively, and simultaneously, prevent the user from being scalded in his mouth and from decayed beverage.

Further, in the invention there can be presented an illumination effect by tilting the cup in order to drink the beverage or liquor put into the cup, and then by automatically inverting the contact so as to become various lighting modes or flickering state, since it is equipped with an angle switch capable of inverting the contact according to a tilt of the cup. When the user does not use the cup, it is automatically sensed and current flowing into the light emitting element is cut off to thus save electricity. Moreover, an inflow of water (i.e., liquids) into the printed circuit board can be prevented when washing the cup, thus the circuits can be prevented from being damaged, since there is provided a packing between an acceptance space and the printed circuit board inserted in the cup.

Although the invention has been shown and described with respect to the preferred embodiments, it will be understood by those skilled in the art that various changes and modifications may be made without departing from the spirit and scope of the invention as defined in the following claims.

What is claimed is:

1. A cup luminous apparatus comprising:

a plurality of resistance detection elements installed by each different height on an inner wall face of a cup, for detecting resistance values changed by a level of fluid, a consistency and a temperature change of beverage put into the cup;

an analog/digital converter for converting analog signals detected by said resistance detection elements into digital signals;

a multiple number of light emitting elements for outputting light of mutually different colors from the inside of the cup towards the outside of the cup;

a controller for outputting a voice signal for a given time in response to an on/off state of a resistance detection element located on the uppermost position among a plurality of resistance detection elements, simultaneously outputting a toggle signal so that a lighting state of the light emitting element is converted, and outputting a lighting signal so that only one light emitting element among a multiple number of light emitting elements is turned on, in case a resistance detection element positioned on the lowermost lot is turned "on", and sending a lights-out signal so that all the light emitting elements are turned off, in case a resistance detection element positioned on the lowermost lot is turned "off", and providing a lighting signal so that all the light emitting elements are turned on, in case a resistance value inputted from said analog/digital converter equals preset proper consistency data and preset proper temperature data, and outputting a flicker signal so that the light emitting element is flickered in order to inform of a decay and an overheating of the beverage, in case the resistance value inputted from the analog/digital converter equals preset decay consistency data and preset overheating temperature data; and a voice output element equipped in said cup and driven by the voice signal outputted through the controller.

2. The apparatus of claim 1, further comprising:

a multiple of light transfer means installed in said cup, for transferring the light emitted from each of the light emitting elements and transferring the light through each of different paths; and an optic diffusion lens formed on an edge part of an upper end of the cup, for diffusing the light transferred from said light transfer means.

3. The apparatus of claim 2, wherein said light transfer means is formed by a hollow hole having a constant diameter in the cup.

4. The apparatus of claim 2, wherein said light transfer means is optical fibers buried in said cup.

5. The apparatus of claim 1, further comprising a touch switch connected to an input port of said controller and installed in a handle of the cup, for detecting a state that the user takes of the handle of the cup, thereby making said light emitting elements light-up through the controller.

6. The apparatus of claim 1, comprising an angle switch in which a contact state is inverted in case that said cup is tilted over a given angle and a flickering time of the light emitting element is controlled by the controller.

7. The apparatus of claim 6, wherein said angle switch comprises:

a lower contact of a dish shape that an upper part is wide and a lower part is narrow;

an upper contact of a flat shape positioned on an upper side distant from said lower contact, in an isolation state from the lower contact;

an insulation case for connecting with said lower contact and said upper contact; and a metal bead positioned within a space formed by the lower and upper contacts, for shorting the lower contact and the upper contact when said metal bead is caught therebetween in case that the cup is tilted.

8. The apparatus of claim 6, characterized in:

an acceptance space formed in the lower part of the cup;

a circular flute in which a packing is located, said circular flute being formed on an inner face of the acceptance space;

a packing inserted into said circular flute and situated on an outer circumference face of a case in which a printed circuit board is installed thereinside; and a concave lens and a convex lens on which the light emitting element is situated, said concave lens and a convex lens being positioned on the center of the inner upper side of the acceptance space and the bottom face of the cup.

* * * * *